W. L. BROOKS.
LOCK NUT.
APPLICATION FILED JAN. 22, 1916.
1,190,098.
Patented July 4, 1916.
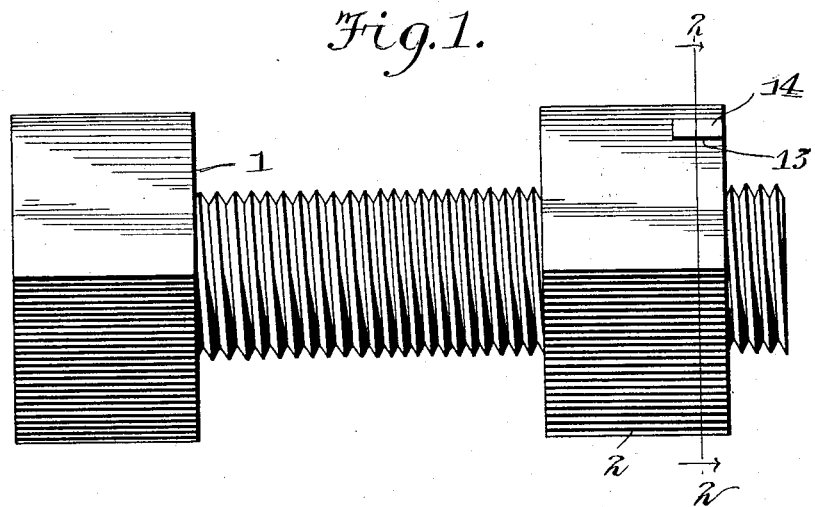
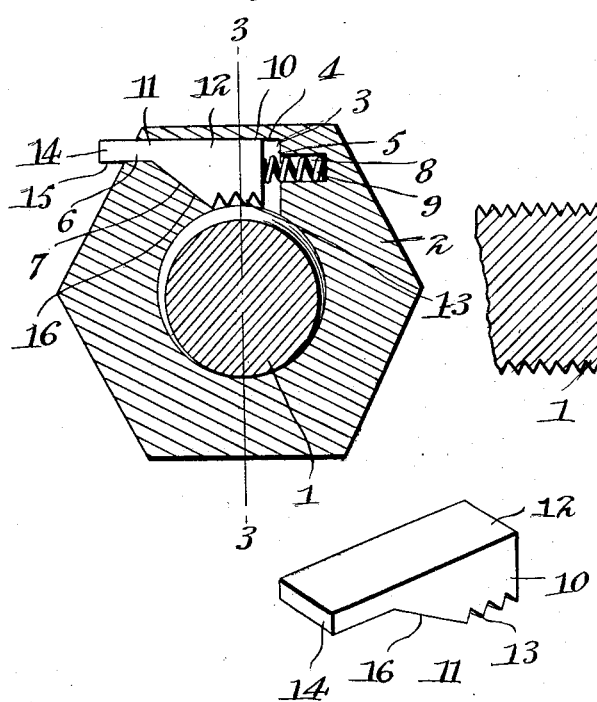
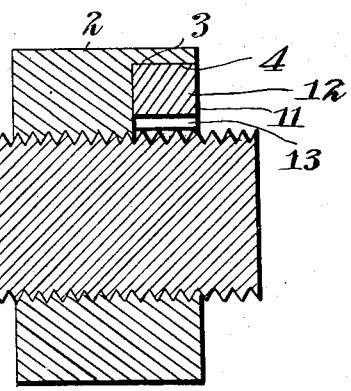
Inventor
W. L. Brooks,
Witness
Frederick W. Ely.
By Victor J. Evans
Attorney

UNITED STATES PATENT OFFICE.

WILLIAM L. BROOKS, OF SHARON, PENNSYLVANIA.

LOCK-NUT.

1,190,098.  Specification of Letters Patent.  Patented July 4, 1916.

Application filed January 22, 1916. Serial No. 73,689.

*To all whom it may concern:*

Be it known that I, WILLIAM L. BROOKS, a citizen of the United States, residing at Sharon, in the county of Mercer and State of Pennsylvania, have invented new and useful Improvements in Lock-Nuts, of which the following is a specification.

The present invention relates to improvements in means for securing nuts and bolts against accidental removal, and the primary object of the invention is to provide a device of this character which shall be simple, cheap, easy to manufacture, and which may be readily employed upon any other ordinary bolt construction and which will perform the functions for which it is adapted with ease, accuracy and surety.

With the above and other objects in view, the improvements resides in the construction, combination and arrangement of parts set forth in the following specification and falling within the scope of the appended claims.

In the drawing: Figure 1 is a view of a nut and bolt locked in accordance with the present invention, Fig. 2 is a sectional view approximately on the line 2—2 of Fig. 1, Fig. 3 is a sectional view approximately on the line 3—3 of Fig. 2, and Fig. 4 is a perspective view of the locking dog.

In the drawing, the numeral 1 designates a bolt of any ordinary construction and 2 a nut therefor. The nut is provided with a pocket 3 which has its outer wall 4 preferably arranged in a line with one of the sides of the nut, its inner wall 5 arranged at a right angle to the wall 4 and communicating with the bore of the nut. The wall 4 communicates with the exterior of the nut, and arranged diametrically opposite the said wall 4 is an inner parallel wall 6 which also communicates with the exterior of the nut, while formed with and providing an extension of the wall 6 is an angular wall 7 directed toward the bore of the nut and terminating a suitable distance away from the inner wall 5 of the pocket 3. The inner wall is formed with a depression 8 for the reception of a spring 9, and this spring is adapted to exert a tension upon the widened end 10 of a locking dog 11. The dog 11 includes a widened body portion 12, the inner face of which being formed with teeth 13 and a tail 14 which provides an extension of the body 12. The tail is substantially rectangular in formation, and the outer surface thereof provides a continuation of the straight edge of the body. The tail is adapted to be snugly received in the pocket provided by the walls 4 and 6, so that the straight edge of the dog will rest at all times against the straight wall 6 of the said pocket, the length of the tail being sufficient to permit of the same projecting a suitable distance through the reduced opening for the pocket. The edge of the dog provided with the teeth and the inner wall 15 of the tail 14 is arranged at an angle, as indicated by the numeral 16, the said angle corresponding with the angular wall 7 of the pocket. The spring 9 normally forces the angular wall 16 against the angular wall 7 of the pocket to bring the teeth within the bore of the nut and as a consequence into engagement with the threads of the bolt, but an inward pressure upon the tail of the dog will force the same toward the wall 5 of the pocket against the tension of the spring 9, thus bringing the teeth out of the area of the bolt and permitting the bolt being screwed upon the nut or the nut upon the bolt. When the nut is screwed to a desired position, the pressure of the dog is released and the spring will force the teeth 13 of the dog within the area of the bore of the nut and consequently into engagement with the threads of the bolt. A turning of the nut or bolt in an unscrewing direction will more forcibly bring the teeth 13 into engagement with the threads of the bolt and the angular edge 16 of the dog contacting with the angular wall 7 of the pocket provides a stop for the said dog, and the wedging action between these members assists the cross sectionally rectangular tongue in sustaining the outer edge of the dog into engagement with the straight wall 4 of the pocket.

I am aware of the fact that other locking devices in which a slidable dog is provided with teeth co-acts with the threads of the bolt are well known in the art, and therefore I lay no claim to such structure, but What I do claim is:

In combination, a bolt and a nut threaded on the bolt, said nut having a pocket including an outer straight wall and an inner end wall arranged at a right angle to the said straight wall and communicating with the bore of the nut, the outer straight wall communicating with the exterior of the nut, an inner straight wall parallel with the outer straight wall at the entrance to the pocket, a wall at an acute angle to the outer straight wall formed at the terminal of the inner straight wall spaced from the inner end wall of the pocket and communicating with the bore of the nut, a dog including a body portion and a tail shaped to correspond with the shape of the pocket, the body of the dog being of a lesser length than the length of the deeper portion of the pocket and the tail extending through the opening for the pocket, a spring forcing the tail of the dog through the pocket to bring the teeth of the dog within the area of the nut opening and into engagement with the threads of the bolt, the said tongue and angular portion thereof contacting with the walls of the pocket adapted to retain the outer edge of the lock at all times in engagement with the outer wall of the pocket, substantially as described.

In testimony whereof I affix my signature in presence of two witnesses.

WILLIAM L. BROOKS.

Witnesses:
MARY R. McCANN,
CHAS S. FLOWER.

Copies of this patent may be obtained for five cents each, by addressing the "Commissioner of Patents, Washington, D. C."